United States Patent
Jang

(10) Patent No.: US 9,501,123 B2
(45) Date of Patent: Nov. 22, 2016

(54) SEMICONDUCTOR APPARATUS

(71) Applicant: SK hynix Inc., Icheon-si Gyeonggi-do (KR)

(72) Inventor: Mun Seon Jang, Icheon-si (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 305 days.

(21) Appl. No.: 14/224,287

(22) Filed: Mar. 25, 2014

(65) Prior Publication Data

US 2015/0185796 A1     Jul. 2, 2015

(30) Foreign Application Priority Data

Dec. 30, 2013   (KR) .................. 10-2013-0166986

(51) Int. Cl.
*G06F 1/28* (2006.01)

(52) U.S. Cl.
CPC .............. *G06F 1/28* (2013.01); *Y10T 307/858* (2015.04)

(58) Field of Classification Search
CPC ........................................................ G06F 1/26
See application file for complete search history.

(56) References Cited

U.S. PATENT DOCUMENTS

| | | | |
|---|---|---|---|
| 6,515,903 B1 * | 2/2003 | Le ........................ | G11C 16/30 327/536 |
| 6,639,470 B1 * | 10/2003 | Andrys ................. | H03F 1/0261 327/309 |
| 2005/0185491 A1 * | 8/2005 | Kim ................... | G11C 11/40626 365/222 |

FOREIGN PATENT DOCUMENTS

KR        1020050068332 A        7/2005

* cited by examiner

*Primary Examiner* — Kim Huynh
*Assistant Examiner* — Eric Chang
(74) *Attorney, Agent, or Firm* — William Park & Associates Ltd.

(57) ABSTRACT

A power-up circuit of a semiconductor apparatus includes a detection block configured to detect a first target level of an external voltage and activate a power-up signal; and a bias block configured to divide the external voltage according to a division ratio that is variable in response to the power-up signal, and output a bias voltage.

17 Claims, 4 Drawing Sheets

SEMICONDUCTOR APPARATUS

CROSS-REFERENCES TO RELATED APPLICATION

The present application claims priority under 35 U.S.C. §119(a) to Korean application number 10-2013-0166986, filed on Dec. 30, 2013, in the Korean Intellectual Property Office, which is incorporated herein by reference in its entirety.

TECHNICAL FIELD

Various embodiments relate to a semiconductor apparatus, and more particularly, to a power-up circuit of a semiconductor apparatus.

BACKGROUND

A semiconductor apparatus may operate by being supplied with an external voltage from an exterior. The semiconductor apparatus may start to operate when the external voltage rises over an appropriate level in an initializing operation. Accordingly, the semiconductor apparatus may include a power-up circuit to detect the level of the external voltage.

The power-up circuit of the semiconductor apparatus may detect the level of the external voltage and activate a power-up signal when the external voltage rises over the appropriate level. The semiconductor apparatus may start an internal operation only when the power-up signal is activated.

SUMMARY

In an embodiment, a power-up circuit of a semiconductor apparatus may include: a detection block configured to detect a first target level of an external voltage and activate a power-up signal. The power up-circuit may also include: a bias block configured to divide the external voltage according to a division ratio that is variable in response to the power-up signal, and output a bias voltage.

In an embodiment, a power-up circuit of a semiconductor apparatus may include: a detection block configured to output a power-up signal in response to a detection signal which is outputted from a detection node according to a pull-up driving force and a pull-down driving force. The power-up circuit may also include: a bias block configured to output a bias voltage in response to the power-up signal to control the pull-up driving force and the pull-down driving force.

In an embodiment, a system comprises: a processor; a controller configured to receive a request and a data from the processor; and a memory unit configured to receive the request and the data from the controller. The memory unit includes: a detection block configured to detect a first target level of an external voltage and activate a power-up signal. The memory unit also includes: a bias block configured to divide the external voltage according to a division ratio that is variable in response to the power-up signal, and output a bias voltage.

DETAILED DESCRIPTION

Hereinafter, a semiconductor apparatus will be described below with reference to the accompanying drawings through various embodiments. A power-up circuit of a semiconductor apparatus which can stably output a power-up signal of the semiconductor apparatus even when noise is temporarily generated in an external voltage supplied to the semiconductor apparatus is described herein. According to the embodiments, a power-up circuit of a semiconductor apparatus may stably output a power-up signal. After the semiconductor apparatus starts an internal operation, it is required that a power-up circuit stably outputs the power-up signal without being influenced by temporary noise in the external voltage. When the power-up circuit deactivates the power-up signal in response to a temporary decrease in the level of the external voltage, since the semiconductor apparatus may be abnormally reset, a circuit configuration for preventing this phenomenon from occurring may be demanded.

Figure 1:
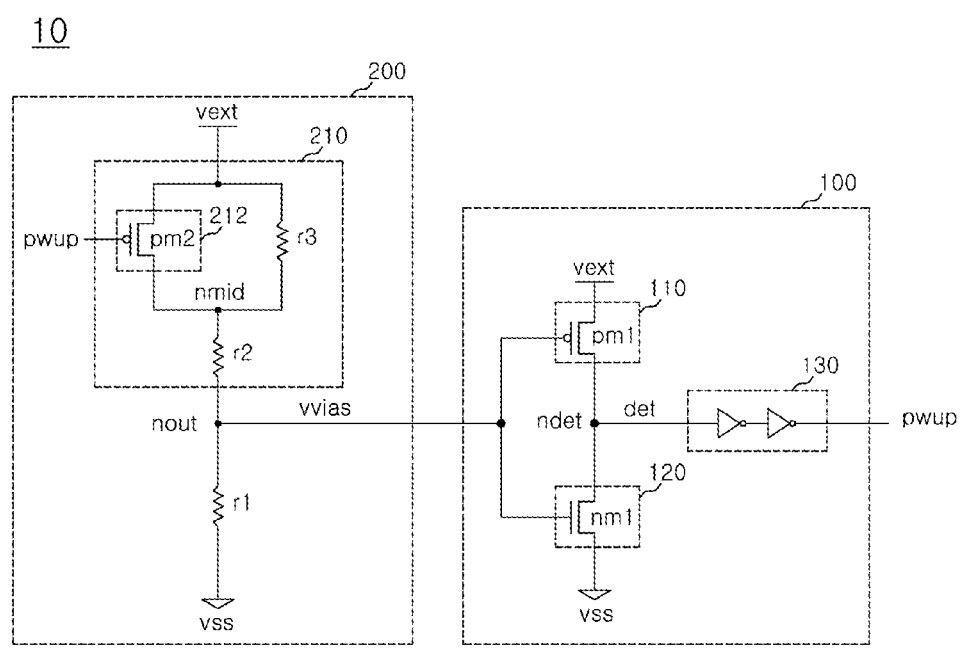
FIG. 1 is a circuit diagram exemplarily showing a power-up circuit of a semiconductor apparatus in accordance with an embodiment.

FIG. 1 is a circuit diagram exemplarily showing a power-up circuit 10 of a semiconductor apparatus in accordance with an embodiment.

The power-up circuit 10 may include a detection block 100 and a bias block 200.

The detection block 100 may be configured to detect a first target level of an external voltage vext and activate a power-up signal pwup, in response to a bias voltage vvias. The first target level may be a threshold level of the external voltage vext which is appropriate for the operation of the semiconductor apparatus. The detection block 100 may output the power-up signal pwup in response to a detection signal det which is outputted according to a pull-up driving force of a pull-up driving unit 110 for driving a detection node ndet with the external voltage vext; and a pull-down driving force of a pull-down driving unit 120 for driving the detection node ndet with a ground voltage vss.

The detection block 100 need stably output the power-up signal pwup which is activated, even though the external voltage vext becomes unstable and temporarily falls to a level lower than the first target level after the power-up signal pwup is activated. Thus, the detection block 100 according to an embodiment may deactivate the power-up signal pwup by detecting a second target level of the external voltage vext lower than the first target level in response to the bias voltage vvias, in the case where the power-up signal pwup is activated.

The bias block 200 may be configured to output the bias voltage vvias in response to the power-up signal pwup to control the pull-up driving force of the pull-up driving unit 110 and the pull-down driving force of the pull-down driving unit 120 for the detection node ndet. For example, the bias block 200 may output the bias voltage vvias to increase the pull-up driving force when compared to immediately before the power-up signal pwup is activated, in the case where the power-up signal pwup is activated. For example, the bias block 200 may output the bias voltage vvias to decrease the pull-down driving force when compared to immediately before the power-up signal pwup is activated, in the case where the power-up signal pwup is activated.

In detail, the bias block 200 may divide the external voltage vext according to a division ratio that is variable in response to the power-up signal pwup, and may output the bias voltage vvias. In the case where the power-up signal pwup is activated, the bias block 200 may output the bias voltage vvias by dividing the external voltage vext according to a division ratio decreased when compared to immediately before the power-up signal pwup is activated. In other words, the bias block 200 may output the bias voltage vvias of a level lower than immediately before the power-up signal pwup is activated, in the case where the power-up signal pwup is activated.

The detection block 100 may include the pull-up driving unit 110, the pull-down driving unit 120, and a buffer unit 130.

The pull-up driving unit 110 may be configured to drive the detection node ndet with the external voltage vext in response to the bias voltage vvias. The pull-down driving unit 120 may be configured to drive the detection node ndet with the ground voltage vss in response to the bias voltage vvias. The detection signal det may be outputted from the detection node ndet. The buffer unit 130 may be configured to buffer the detection signal det and output the power-up signal pwup.

The pull-up driving unit 110 may include a first PMOS is transistor pm1. The first PMOS transistor pm1 may form a current path by the source and the drain thereof between an external voltage terminal and the detection node ndet, and may be applied with the bias voltage vvias through the gate thereof.

The pull-down driving unit 120 may include a first NMOS transistor nm1. The first NMOS transistor nm1 may form a current path by the source and the drain thereof between a ground terminal and the detection node ndet where the bias voltage vvias may be generated in response to the external voltage vext, and may be applied with the bias voltage vvias through the gate thereof.

The buffer unit 130 may include even-numbered inverters which are electrically coupled in series.

The bias block 200 may include a resistance variable unit 210 and a first resistor r1.

The resistance variable unit 210 may be electrically coupled between the external voltage terminal and an output node nout. The first resistor r1 may be electrically coupled between the output node nout and the ground terminal.

The resistance variable unit 210 may have a resistance value that is variable in response to the power-up signal pwup. In the case where the power-up signal pwup is activated, the resistance variable unit 210 may have a resistance value that is increased when compared to immediately before the power-up signal pwup is activated.

The resistance variable unit 210 may include a switch is section 212, a second resistor r2 and a third resistor r3. The switch section 212 and the third resistor r3 may be electrically coupled in parallel between the external voltage terminal and an intermediate node nmid. The second resistor r2 may be electrically coupled between the intermediate node nmid and the output node nout.

The switch section 212 may be turned on and off in response to the power-up signal pwup. For example, the switch section 212 may be turned on when the power-up signal pwup is deactivated, and may be turned off when the power-up signal pwup is activated.

The switch section 212 may include a second PMOS transistor pm2. The second PMOS transistor pm2 may form a current path by the source and the drain thereof between the external voltage terminal and the intermediate node nmid, and may be applied with the power-up signal pwup through the gate thereof.

Figure 2:
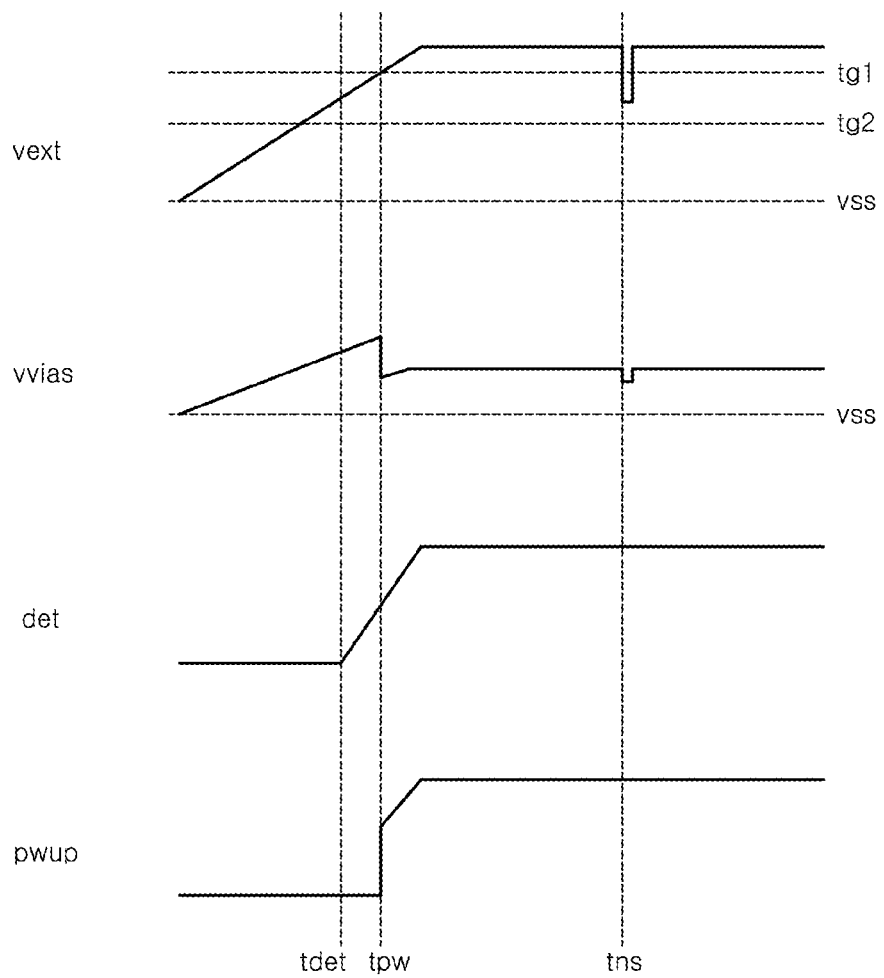
FIG. 2 is a timing diagram explaining an operating method of the power-up circuit in accordance with an embodiment.

FIG. 2 is a timing diagram exemplarily explaining an operating method of the power-up circuit 10 shown in FIG. 1.

Hereinafter, the operating method of the power-up circuit 10 will be described in detail with reference to FIGS. 1 and 2.

The power-up circuit 10 may be applied with the external voltage vext which rises from the level of the ground voltage vss. The power-up circuit 10 may output the power-up signal pwup which is deactivated. The switch section 212 may be turned on in response to the deactivated power-up signal pwup. For the sake of convenience in explanation, it may be assumed that the external voltage terminal and the intermediate node nmid are short-circuited by the switch section 212. The bias block 200 may output the bias voltage vvias according to a division ratio for the external voltage vext. Namely, the bias block 200 may output the bias voltage vvias which is determined according to the following equation.

$$vvias = \frac{r1}{r1 + r2} vext$$

The bias voltage vvias may be generated in response to the external voltage vext at the output node nout.

The bias block 200 may output the bias voltage vvias which gradually rises as the external voltage vext rises. When the bias voltage vvias is larger than the threshold voltage of the first NMOS transistor nm1, the first NMOS transistor nm1 may be turned on and may pull-down drive the detection node ndet with the ground voltage vss. The buffer unit 130 may output the power-up signal pwup which is deactivated, in response to the detection signal det with the level of the ground voltage vss.

Because the rising rate of the bias voltage vvias is smaller than the rising rate of the external voltage vext, the voltage difference between the gate and the source of the first PMOS transistor pm1 may gradually increase as the external voltage vext rises. At a time tdet, when the external voltage vext rises to a predetermined level to satisfy the following equation, the first PMOS transistor pm1 may be turned on and may pull-up drive the detection node ndet with the external voltage vext. In the following equation, $vgs_{pm1}$ is a voltage between the gate and the source of the first PMOS transistor pm1 and $vth_{pm1}$ is the threshold voltage of the first PMOS transistor pm1.

$$vgs_{pm1} \leq vth_{pm1}$$

As the external voltage vext further rises, the pull-up driving force of the first PMOS transistor pm1 for the detection node ndet may become larger than the pull-down driving force of the first NMOS transistor nm1 for the detection node ndet. Accordingly, the voltage level of the detection signal det may rise.

At a time tpw, when the external voltage vext rises to a first target level tg1, the voltage level of the detection signal det may rise higher than the logic threshold of the buffer unit 130. The buffer unit 130 may output the power-up signal pwup which is activated, in response to the detection signal det which has a voltage level higher than the logic threshold.

The switch section 212 may be turned off in response to the power-up signal pwup which is activated. The bias block 200 may output the bias voltage vvias according to a division ratio for the external voltage vext. That is to say, the bias block 200 may output the bias voltage vvias which is determined according to the following equation.

$$vvias = \frac{r1}{r1 + r2 + r3} vext$$

In other words, the bias block 200 may output the bias voltage vvias with a level lower than immediately before the power-up signal pwup is activated, according to a decreased division ratio for the external voltage vext. Therefore, the pull-up driving force of the first PMOS transistor pm1 may be increased and the pull-down driving force of the first NMOS transistor nm1 may be decreased, when compared to immediately before the power-up signal pwup is activated. In this case, at a time tns, even though the external voltage vext becomes unstable and temporarily falls to a level lower than the first target level tg1, the pull-up driving force for the detection node ndet may be sufficiently larger than the pull-down driving force. Thus, the voltage level of the detection signal det may be retained, and the voltage level of the power-up signal pwup may be retained as well.

The power-up circuit 10 may stably output the power-up signal pwup which is activated, in spite of temporary noise generation in the external voltage vext. The power-up circuit 10 may output the power-up signal pwup which is deactivated, only when the external voltage vext falls to a second target level tg2.

Figure 3:
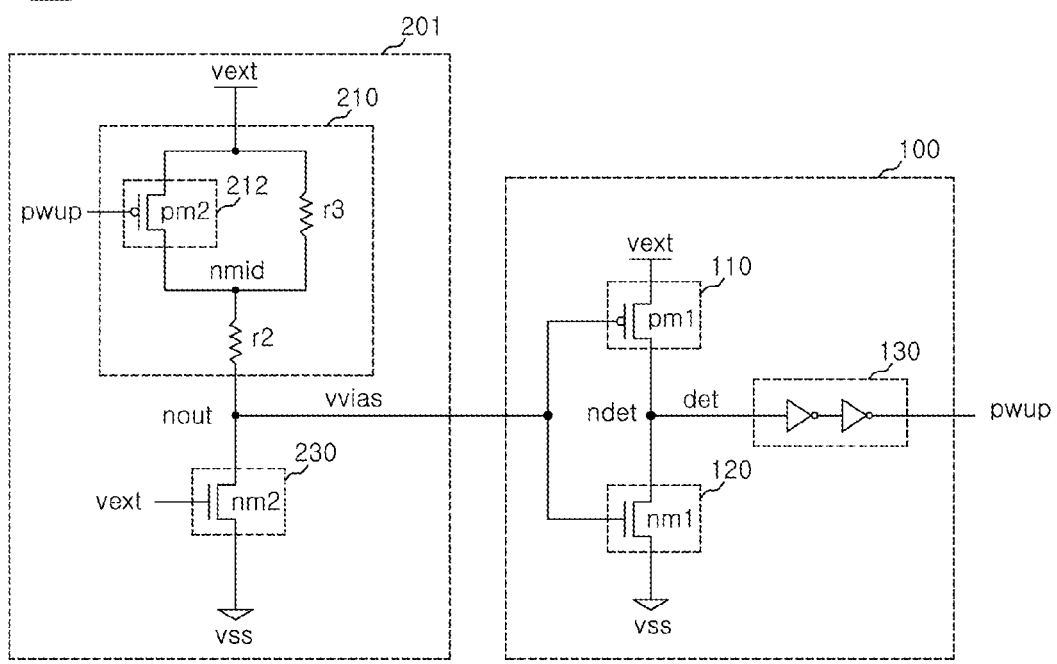
FIG. 3 is a circuit diagram exemplarily showing a power-up circuit of a semiconductor apparatus in accordance with an embodiment.

FIG. 3 is a circuit diagram exemplarily showing a power-up circuit 20 of a semiconductor apparatus in accordance with an embodiment. In describing FIG. 3, the same reference numerals as in FIG. 1 will be used to refer to substantially the same component elements as those of the power-up circuit 10 described above with reference to FIG. 1.

The power-up circuit 20 may include a detection block 100 and a bias block 201. The bias block 201 may include a resistance variable unit 210 and a control unit 230.

The control unit 230 may be configured to at least partially offset a rise in a bias voltage vvias due to a rise in an external voltage vext. The control unit 230 may form a current path between an output node nout and a ground terminal in response to the external voltage vext. The control unit 230 may at least partially offset a rise in the bias voltage vvias, by flowing an increased amount of current from the output node nout to the ground terminal, as the external voltage vext rises.

The control unit 230 may include a second NMOS transistor nm2. The second NMOS transistor nm2 may form a current path by the source and the drain thereof between the ground terminal and the output node nout, and may be applied with the external voltage vext through the gate thereof.

For example, when the deactivated power-up signal pwup is outputted, the bias block 201 may output the bias voltage vvias which is determined according to the following equation. In the following equation, rnm2 is a resistance value of the second NMOS transistor nm2.

$$vvias = \frac{rnm2}{r2 + rnm2} vext$$

Namely, the level of the bias voltage vvias may be determined by rnm2.

In the case where the second NMOS transistor nm2 operates in a triode region as the external voltage vext applied to the gate thereof rises, rnm2 may be expressed as in the following is equation.

$$rnm2 = \frac{1}{\mu c \frac{w}{l}\left(vgs - vth - \frac{vds}{2}\right)}$$

In the above equation, $\mu$ is electron mobility, c is capacitance per a unit area of a capacitor between the gate and a body, w is a channel width, l is a channel length, vgs is a voltage between the gate and the source, vth is a threshold voltage, and vds is a voltage between the drain and the source.

When directly observing the above equation, rnm2 may be decreased as the external voltage vext rises. Therefore, the second NMOS transistor nm2 may at least partially offset a rise in the bias voltage vvias as the external voltage vext rises. In this case, even though the level of the external voltage vext is low, a voltage between the gate and the source of the first PMOS transistor pm1 may be large. Hence, such a configuration may be effective in the case of a semiconductor apparatus which is configured to be supplied with the external voltage vext with a relatively low level. Also, such a configuration may be effective in the case of a semiconductor apparatus in which a first target level is set low.

Figure 4:
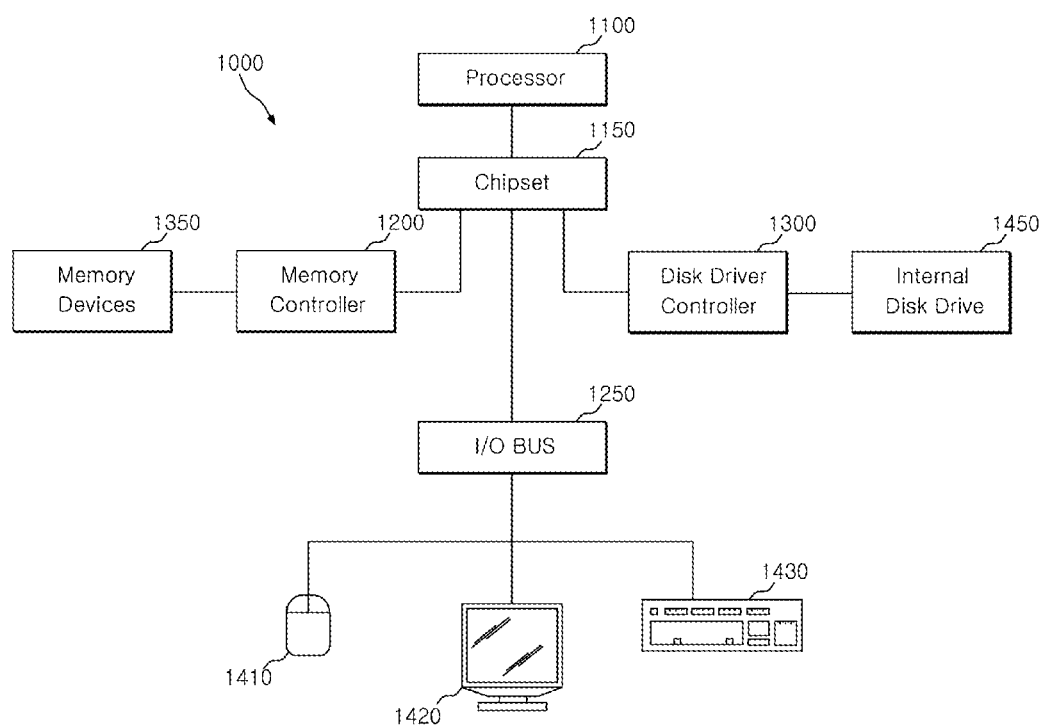
FIG. 4 illustrates a block diagram of a system employing a memory controller circuit in accordance with an embodiment of the invention.

Referring to FIG. 4, a system 1000 may include one or more processors 1100. The processor 1100 may be used individually or in combination with other processors. A chipset 1150 may be electrically coupled to the processor 1100. The chipset 1150 is a communication pathway for signals between the processor 1100 and other components of the system 1000. Other components of the system 1000 may include a memory controller 1200, an input/output ("I/O") bus 1250, and a disk drive controller 1300. Depending on the configuration of the system 1000, any one of a number of different signals may be transmitted through the chipset 1150.

The memory controller 1200 may be electrically coupled to the chipset 1150. The memory controller 1200 can receive a request provided from the processor 1100 through the chipset 1150. The memory controller 1200 may be electrically coupled to one or more memory devices 1350. The memory device 1350 may correspond to the semiconductor apparatus described above.

The chipset 1150 may also be electrically coupled to the I/O bus 1250. The I/O bus 1250 may serve as a communication pathway for signals from the chipset 1150 to the I/O devices 1410, 1420 and 1430. The I/O devices 1410, 1420 and 1430 may include a mouse 1410, a video display 1420, or a keyboard 1430. The I/O bus 1250 may employ any one of a number of communications protocols to communicate with the I/O devices 1410, 1420 and 1430.

The disk drive controller 1300 may also be electrically coupled to the chipset 1150. The disk drive controller 1300 may serve as the communication pathway between the chipset 110 and one or more internal disk drives 1450. The disk drive controller 1300 and the internal disk drive 1450 may communication with each other or with the chipset 1150 using virtually any type of communication protocol.

While certain embodiments have been described above, it will be understood to those skilled in the art that the embodiments described are by way of example only. Accordingly, the semiconductor apparatus described herein should not be limited based on the described embodiments. Rather, the semiconductor apparatus described herein should only be limited in light of the claims that follow when taken in conjunction with the above description and accompanying drawings.

What is claimed is:

1. A power-up circuit of a semiconductor apparatus, comprising:
a detection block configured to detect a first target level of an external voltage and activate a power-up signal, in response to a bias voltage; and
a bias block configured to divide the external voltage according to a division ratio that is variable in response to the power-up signal, and output the bias voltage in response to a divided external voltage,
wherein the bias block outputs an adjusted bias voltage according to the division ratio adjusted in response to the power-up signal which is activated, and
the detection block deactivates the power-up signal when detecting a second target level of the external voltage lower than the first target level in response to the adjusted bias voltage.

2. The power-up circuit according to claim 1, wherein the detection block comprises:
a pull-up driving unit configured to pull-up drive a detection node with the external voltage in response to the bias voltage; and
a pull-down driving unit configured to pull-down drive the detection node with a ground voltage in response to the bias voltage.

3. The power-up circuit according to claim 1, wherein, in the case where the power-up signal is activated, the bias block outputs the bias voltage according to a decreased division ratio.

4. The power-up circuit according to claim 1, wherein, in the case where the power-up signal is activated, the bias block outputs the bias voltage with a lower level.

5. The power-up circuit according to claim 1, wherein the bias block comprises:
a resistance variable unit configured to have a resistance value variable in response to the power-up signal.

6. The power-up circuit according to claim 5, wherein, in the case where the power-up signal is activated, the resistance variable unit has an increased resistance value.

7. The power-up circuit according to claim 6, wherein the resistance variable unit comprises:
a switch section configured to be turned on and off in response to the power-up signal; and
a resistor electrically coupled in parallel to the switch section.

8. The power-up circuit according to claim 1, wherein the bias block further comprises:
a control unit configured to at least partially offset a rise in the bias voltage due to a rise in the external voltage.

9. The power-up circuit according to claim 8, wherein the control unit forms a current path between a detection node at which the bias voltage is generated and a ground terminal, in response to the external voltage.

10. A power-up circuit of a semiconductor apparatus, comprising:
a detection block configured to output a power-up signal by detecting a voltage level of a detection node formed by a pull-up driving force for driving the detection node with an external voltage and a pull-down driving force for driving the detection node with a ground voltage; and
a bias block configured to output a bias voltage in response to the power-up signal to control the pull-up driving force and the pull-down driving force,
wherein the detection block outputs an activated power-up signal when the external voltage has a first target level, and
the bias block outputs an adjusted bias voltage in response to the activated power-up signal to increase the pull-up driving force and decrease the pull-down driving force.

11. The power-up circuit according to claim 10, wherein the bias block outputs the bias voltage by dividing the external voltage according to a division ratio that is variable in response to the power-up signal.

12. The power-up circuit according to claim 11, wherein, in the case where the power-up signal is activated, the bias block outputs the bias voltage according to a decreased division ratio that.

13. The power-up circuit according to claim 10, wherein, in the case where the power-up signal is activated, the bias block outputs the bias voltage with a lower level.

14. The power-up circuit according to claim 10, wherein the detection block deactivates and outputs the power-up signal when the external voltage has a second target level lower than the first target level in the case where the power-up signal is activated.

15. The power-up circuit according to claim 10, wherein the detection block detects the second target level when the external voltage falls to a level lower than the first target level.

16. The power-up circuit according to claim 15, wherein the pull-up driving force is greater than the pull-down driving force when the external voltage falls to a level lower than the first target level.

17. A system comprising:
a processor;
a controller configured to receive a request and a data from the processor; and
a memory unit configured to receive the request and the data from the controller,
wherein the memory unit comprises:
a detection block configured to detect a first target level of an external voltage and activate a power-up signal, in response to a bias voltage; and
a bias block configured to divide the external voltage according to a division ratio that is variable in response to the power-up signal, and output the bias voltage,
wherein the bias block outputs an adjusted bias voltage according to the division ratio adjusted in response to the power-up signal which is activated, and
the detection block deactivates the power-up signal when detecting a second target level of the external voltage lower than the first target level in response to the adjusted bias voltage.

* * * * *